(12) United States Patent
Inoue

(10) Patent No.: US 11,306,938 B2
(45) Date of Patent: Apr. 19, 2022

(54) COMMUNICATION CONTROL SYSTEM AND AIR-CONDITIONING APPARATUS

(71) Applicant: SHARP KABUSHIKI KAISHA, Sakai (JP)

(72) Inventor: Shota Inoue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 269 days.

(21) Appl. No.: 16/616,802

(22) PCT Filed: Jan. 29, 2018

(86) PCT No.: PCT/JP2018/002774
§ 371 (c)(1),
(2) Date: Nov. 25, 2019

(87) PCT Pub. No.: WO2018/220898
PCT Pub. Date: Dec. 6, 2018

(65) Prior Publication Data
US 2020/0088435 A1    Mar. 19, 2020

(30) Foreign Application Priority Data

Jun. 2, 2017  (JP) .............................. JP2017-110466
Sep. 26, 2017 (JP) .............................. JP2017-185158

(51) Int. Cl.
*F24F 11/56*  (2018.01)
*F24F 11/62*  (2018.01)
(Continued)

(52) U.S. Cl.
CPC .......... *F24F 11/56* (2018.01); *F24F 11/0008* (2013.01); *F24F 11/30* (2018.01);
(Continued)

(58) Field of Classification Search
CPC .. F24F 11/56; F24F 11/62; F24F 11/30; F24F 11/54; F24F 11/0008; F24F 11/57;
(Continued)

(56) References Cited

U.S. PATENT DOCUMENTS 8,774,144 B2 *   7/2014  Nogawa ................. H04W 12/06
                                                    370/255
2014/0306817 A1 * 10/2014 Ricci ..................... G06F 3/0482
                                                    340/457
(Continued)

FOREIGN PATENT DOCUMENTS

JP        2010-021802 A      1/2010
JP        2010-118825 A      5/2010
(Continued)

*Primary Examiner* — Ziaul Karim
(74) *Attorney, Agent, or Firm* — ScienBiziP, P.C.

(57) ABSTRACT

A dedicated wireless access point is not required, and an air-conditioning apparatus can be paired with a wireless access point simply by operating at hand an operating device that is separate from the air-conditioning apparatus. A remote control (15) is provided with a pairing request instruction button for instructing an air conditioner (12) to cause a first communicator serving as a wireless device of the air conditioner (12) to transmit pairing request data, and upon receiving, from the remote control (15), a signal indicating that the pairing request instruction button has been operated, the air conditioner (12) transmits pairing request data through the first communicator, completes a pairing upon receiving authentication data from a wireless AP (13), and connects to the wireless AP (13).

8 Claims, 12 Drawing Sheets

(51) Int. Cl.
- *F24F 11/30* (2018.01)
- *F24F 11/54* (2018.01)
- *F24F 11/00* (2018.01)
- *H04W 12/06* (2021.01)
- *H04W 84/12* (2009.01)
- *H04W 12/50* (2021.01)

(52) U.S. Cl.
CPC .............. *F24F 11/54* (2018.01); *F24F 11/62* (2018.01); *H04W 12/06* (2013.01); *H04W 12/50* (2021.01); *H04W 84/12* (2013.01)

(58) Field of Classification Search
CPC ....... F24F 11/58; H04W 12/50; H04W 12/06; H04W 84/12; H04W 4/80; H04Q 9/00; G06F 13/00; H04M 1/00; H04M 11/00
See application file for complete search history.

(56) References Cited

U.S. PATENT DOCUMENTS

| | | | | |
|---|---|---|---|---|
| 2014/0359732 A1* | 12/2014 | Kuroda | ............... | H04W 12/069 726/6 |
| 2017/0182957 A1* | 6/2017 | Watson | .................... | B60N 2/90 |
| 2018/0347847 A1* | 12/2018 | Taruki | ..................... | F24F 11/89 |

FOREIGN PATENT DOCUMENTS

| | | | |
|---|---|---|---|
| JP | 2012-080482 A | 4/2012 |
| JP | 2015-008454 A | 1/2015 |
| JP | 2016-116159 A | 6/2016 |
| JP | 5962059 B2 | 8/2016 |
| JP | 2017-083149 A | 5/2017 |

* cited by examiner

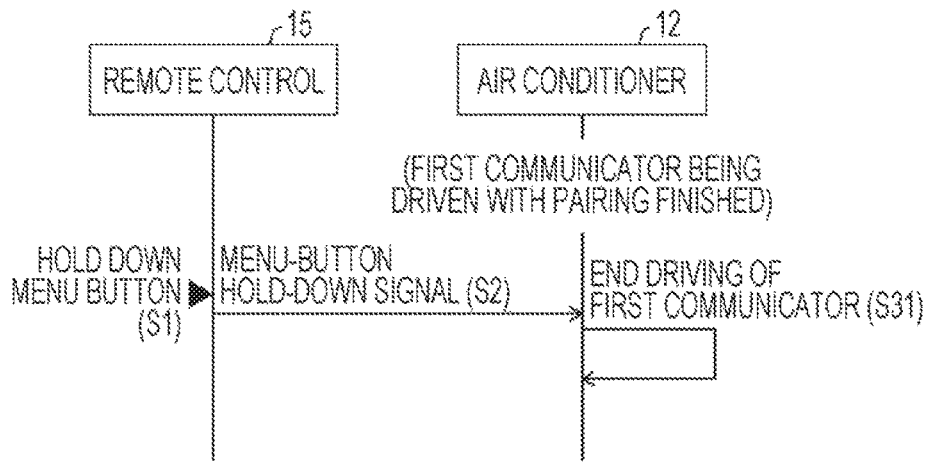
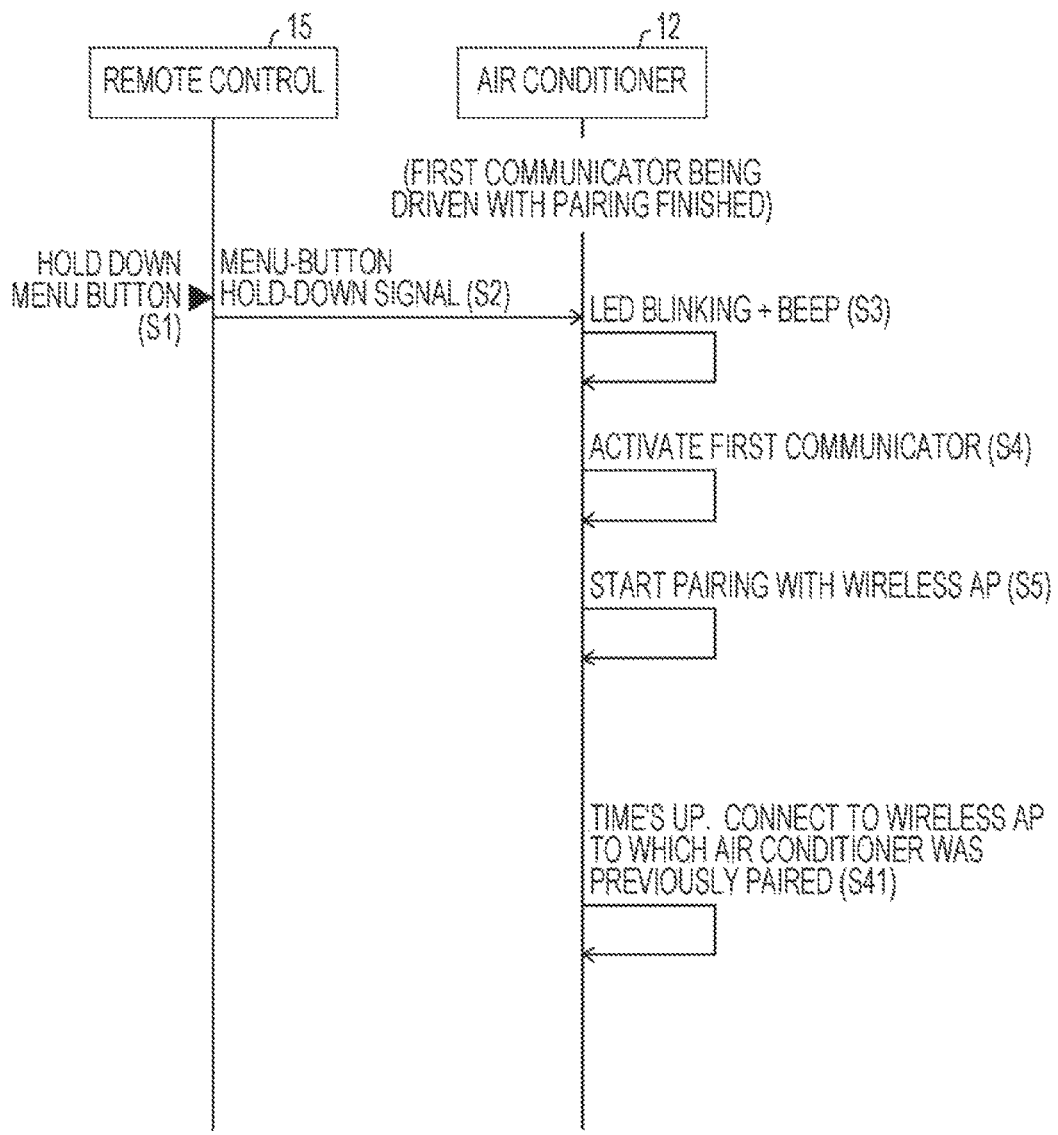

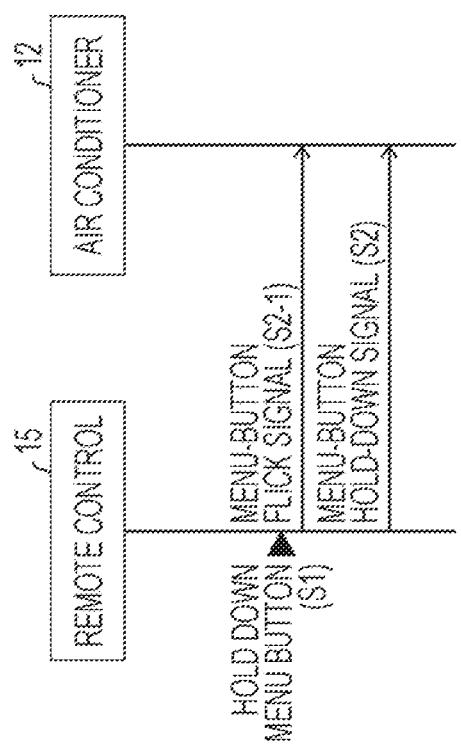

COMMUNICATION CONTROL SYSTEM AND AIR-CONDITIONING APPARATUS

TECHNICAL FIELD

The present invention relates to a communication control system that controls a connection between an air-conditioning apparatus and a communication network, including a pairing of an air-conditioning apparatus having a wireless device and a wireless access point.

BACKGROUND ART

There has been widespread use of a technology for associating a mobile terminal and an air-conditioning apparatus with each other via a communication network and remotely controlling the air-conditioning apparatus with the mobile terminal from outdoors. The remote control requires mounting of the air-conditioning apparatus (indoor unit) with a wireless LAN module and a pairing connection between the wireless LAN module and a wireless access point of a wireless LAN router or the like.

PTL 1 describes a technology for making a pairing of an air conditioner and a wireless access point by remote control with an infrared remote control for controlling the air conditioner.

Further, PTL 2 describes an air-conditioning apparatus in which with a wireless remote control paired (first pairing) with an indoor unit, the indoor unit and a wireless device are paired with each other (second pairing).

CITATION LIST

Patent Literature

PTL 1: Japanese Unexamined Patent Application Publication No. 2015-8454
PTL 2: Japanese Patent No. 5962059
PTL 3: Japanese Unexamined Patent Application Publication No. 2012-80482
PTL 4: Japanese Unexamined Patent Application Publication No. 2017-83149

SUMMARY OF INVENTION

Technical Problem

However, the conventional pairing methods, described in PTL 1 and PTL 2, that involve the use of a remote control have the following problems.

The method of PTL 1 requires the wireless access point, which is paired with the air conditioner, to have an infrared light receiving function. Since a common wireless access point is not mounted with an infrared light receiving function, use of the technology requires a dedicated wireless access point.

The method of PTL 2 requires a switch provided on the indoor unit to be pressed during the first pairing by which the wireless remote control is paired with the indoor unit. This makes it impossible to complete a pairing process simply by operating the wireless remote control at hand.

An aspect of the present invention has as an object to provide a communication control system that does not require a dedicated wireless access point and that makes it possible to pair an air-conditioning apparatus with a wireless access point simply by operating at hand an operating device that is separate from the air-conditioning apparatus.

Solution to Problem

In order to solve the foregoing problem, a communication control system according to an aspect of the present invention includes an air-conditioning apparatus having a wireless device and an operating device that is capable of wirelessly operating the air-conditioning apparatus. The communication control system controls a connection between the air-conditioning apparatus and a communication network. The operating device is capable of accepting a pairing request operation that causes the wireless device to transmit pairing request data. Upon receiving a signal indicating that the operating device has accepted the pairing request operation, the air-conditioning apparatus causes the wireless device to transmit the pairing request data, completes a pairing upon receiving, from a wireless access point, authentication data corresponding to the pairing request data thus transmitted, and connects the wireless device to the wireless access point.

Advantageous Effects of Invention

An aspect of the present invention eliminates the need for a dedicated wireless access point and makes it possible to pair an air-conditioning apparatus with a wireless access point simply by operating at hand an operating device that is separate from the air-conditioning apparatus.

BRIEF DESCRIPTION OF DRAWINGS

FIG. 9 is a chart showing the sending and receiving of instructions and replies among constituent elements after the holding down of a menu button on the remote control in a state where the air conditioner is connected to a communication network.

FIG. 10 is a chart showing the sending and receiving of instructions and replies among constituent elements after the holding down of the menu button at the time that a first communicator is powered off with pairing finished.

FIG. 15 is a chart showing in detail signals that are sent from a remote control to an air conditioner after a menu button has been held down.

DESCRIPTION OF EMBODIMENTS

Embodiment 1

Figure 1:
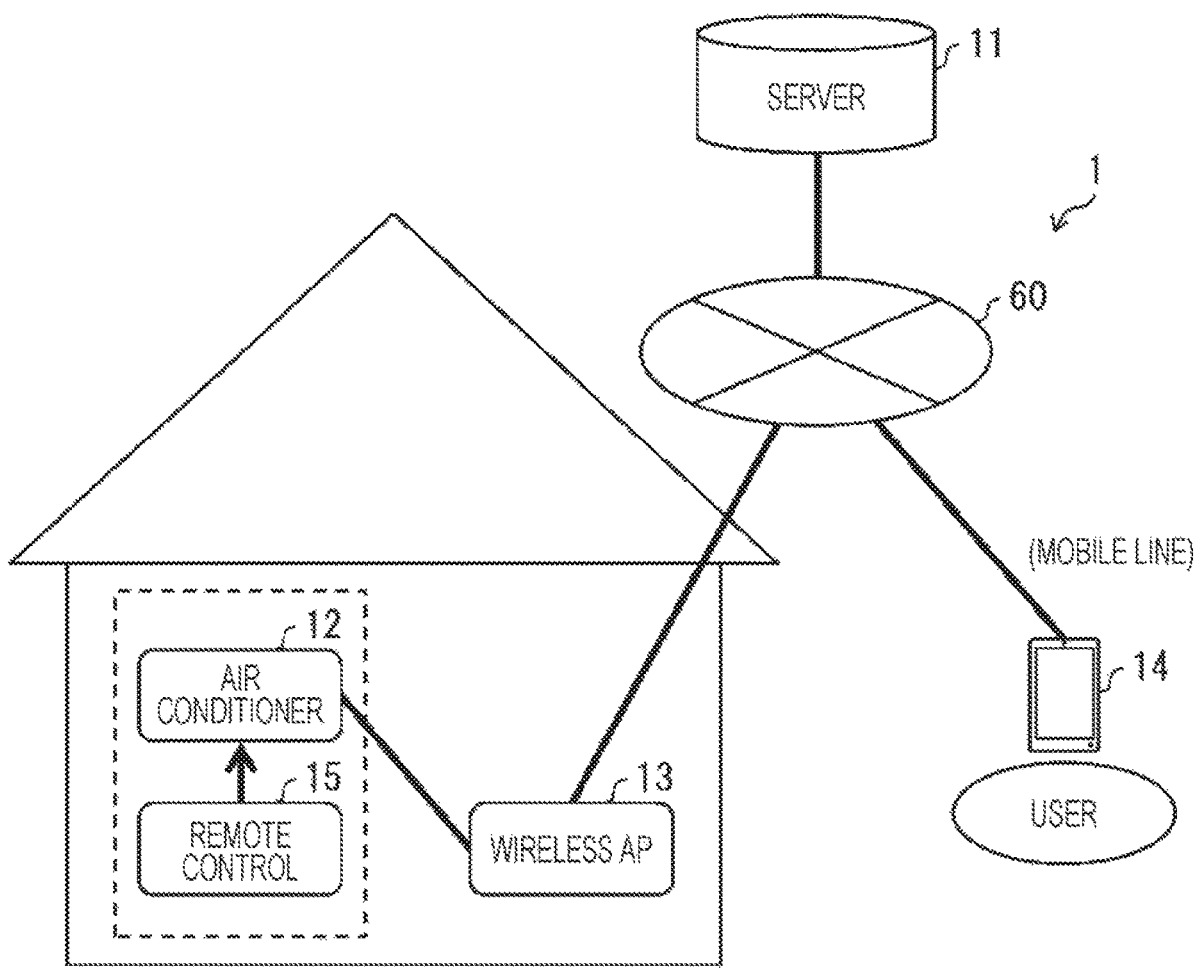
FIG. 1 is a schematic explanatory diagram showing a configuration of a remote control system including a communication control system according to an embodiment of the present invention.

An embodiment of the present invention is described below with reference to the drawings. FIG. 1 is a schematic explanatory diagram showing a configuration of a remote control system including a communication control system according to the present embodiment. It should be noted that FIG. 1 shows a state where a user is outdoors.

(Brief Overview of Remote Control System)

As shown in FIG. 1, a remote control system 1 including a communication control system according to the present embodiment includes a server 11, an air-conditioning apparatus (hereinafter simply referred to as "air conditioner") 12, a wireless access point (hereinafter referred to as "wireless AP") 13, a mobile terminal 14, and a remote control (remote control device: remote controller) 15 of the air conditioner 12.

The air conditioner 12 is connected to the server 11 and the mobile terminal 14 via the wireless AP 13. The wireless AP 13 is a communication device such as a router or access point of a wireless LAN (wireless local area network). Wireless communications may involve the use of one of the wireless LAN standards such as IEEE802.11a, IEEE802.11b, IEEE802.11g, or IEEE802.11n as well as Wi-Fi (registered trademark). Of course, wireless communications may be based on other LAN standards other than these.

The mobile terminal 14 is a smartphone, a tablet terminal, or the like. The server 11 serves to manage the air conditioner 12 and is connected to a communication network 60 including the Internet.

The mobile terminal 14 and the server 11 are connected to each other via the communication network 60. The mobile terminal 14 and the Internet over the communication network 60 are connected to each other through the use of 3G, 4G, LTE (Long Term Evolution), the wireless AP 13, or a public Wi-Fi (registered trademark) access point.

The air conditioner 12, the server 11, and the mobile terminal 14 are associated with one another, whereby the user can remotely control the air conditioner 12 with the mobile terminal 14.

(Configuration of Main Components of Air Conditioner 12)

Figure 2:
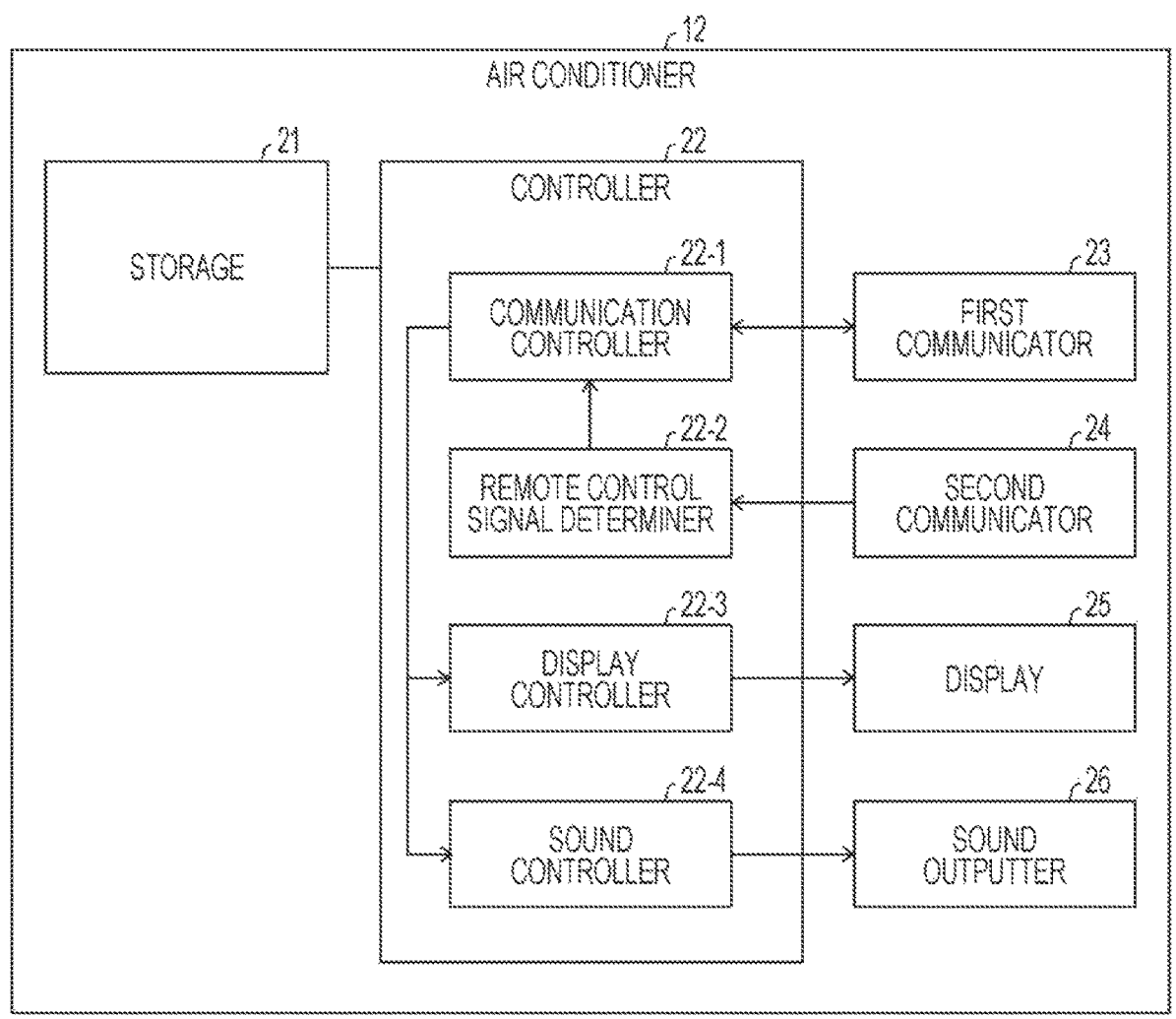
FIG. 2 is a block diagram showing a configuration of an air conditioner included in the remote control system.
Figure 5:
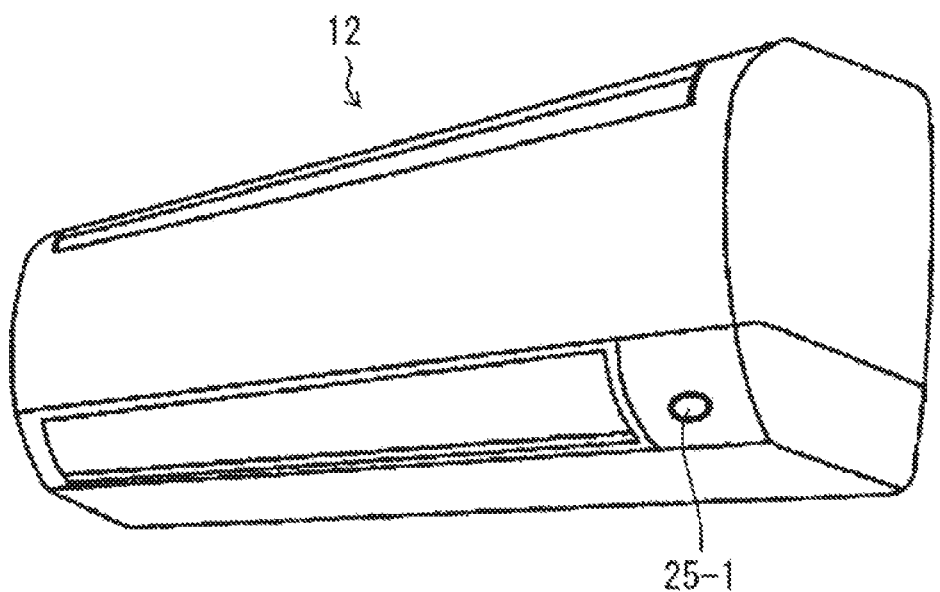
FIG. 5 is a perspective view showing an appearance of the air conditioner.

FIG. 2 is a block diagram showing the main components of the air conditioner 12. It should be noted that FIG. 2 omits to illustrate a configuration regarding an air-conditioning function, i.e. an original function, of the air conditioner 12. FIG. 5 is a perspective view showing an appearance of the air conditioner 12.

As shown in FIG. 2, the air conditioner 12 includes a storage 21, a controller 22, a first communicator (wireless device) 23, a second communicator 24, a display 25, a sound outputter 26, and other components.

The storage 21 has various types of information stored therein. The controller 22 includes a communication controller 22-1, a remote control signal determiner 22-2, a display controller 22-3, a sound controller 22-4. The communication controller 22-1 controls the first communicator 23, and the remote control signal determiner 22-2 determines a remote control signal received by the second communicator 24. The display controller 22-3 controls the display 25, and the sound controller 22-4 controls the sound outputter 26. The display controller 22-3 and the sound controller 22-4 are notified of a wireless communication state by the communication controller 22-1.

The first communicator 23 is a wireless communication module that enables a connection between the air conditioner 12 and the communication network 60 under control of the communication controller 22-1. Upon receiving an instruction according to a communication standard that causes a pairing to start, the first communicator 23 enters into a pairing mode and starts a pairing. For example, in the case of a WPS (Wi-Fi (registered trademark) Protected Setup (registered trademark)) function, a pressing of a WPS button constitutes entry into a pairing mode. That is, upon receiving an instruction to start a pairing according to the communication standard being used, the first communicator 23 transmits pairing request data. After this, the first communicator 23 completes the pairing upon receiving, through a wireless access point, authentication data corresponding to the pairing request data that it has transmitted, and connects to the wireless access point with which it has been paired.

The second communicator 24 is a receiver that receives a remote control signal from the remote control (operating device) 15. A remote control signal may be infrared rays or radio waves. Further, the second communicator 24 mutually communicates with the remote control 15. The second communicator 24 sends a received remote control signal to the remote control signal determiner 22-2.

The remote control signal determiner 22-2 determines, on the basis of a remote control signal received by the second communicator 24, whether a predetermined button or, in the present embodiment, the after-mentioned menu button 33-1 on the remote control 15 has been held down. Upon determining that the menu button 33-1 has been held down, the remote control signal determiner 22-2 notifies the communication controller 22-1 accordingly. The menu button 33-1 is a pairing request instruction button that causes the air conditioner 12 to transmit pairing request data.

Upon being notified that the menu button 33-1 has been held down, the communication controller 22-1 determines, in a case where the first communicator 23 is powered off, that it has been instructed to start a pairing, activates the first communicator 23, and causes the first communicator 23 to transmit pairing request data. Meanwhile, upon being notified that the menu button 33-1 has been held down in a state where the first communicator 23 is activated (powered on), the communication controller 22-1 powers off the first communicator 23.

As shown in FIG. 5, the display (annunciator) 25 has an LED lamp 25-1 that indicates a state of communication of the first communicator 23. In the present embodiment, the display 25 is designed to inform the user of a state of wireless communication by the first communicator 23 by means of a lighting pattern of the single LED lamp 25-1. Under control of the display controller 22-3, the display 25 annunciates, as a wireless communication state, a state as to whether the air conditioner 12 (first communicator 23) is connected to the communication network 60, whether a pairing has succeeded or failed as a result of a pairing process, whether a pairing process is being executed, or the like. Further, in the present embodiment, the display 25 also annunciates the selection of the air conditioner 12 as a target of pairing.

Under control of the sound controller 22-4, the sound outputter (annunciator) 26 informs the user of a state of wireless communication by the first communicator 23 by outputting a beep, a melody, a voice, or the like. The sound outputter 26 annunciates whether a pairing has succeeded or failed as a result of a pairing process. Further, in the present embodiment, the sound outputter 26 cooperates with the display 25 to annunciate the selection of the air conditioner 12 as a target of pairing. Furthermore, the sound outputter 26 may be configured to output a beep, a melody, or a voice to annunciate when the air conditioner 12 (first communicator 23) has become connected to the communication network 60 with the first communicator 23 activated. Conversely, the sound outputter 26 may be configured to output a beep, a melody, or a voice to annunciate when the air conditioner 12 (first communicator 23) has become disconnected from the communication network 60 with the first communicator 23 powered off. A beep, a melody, a voice, or the like that expresses the content of notification to the user is preferred, and which of them to use is a matter of appropriate setting.

(Configuration of Remote Control 15)

Figure 3:
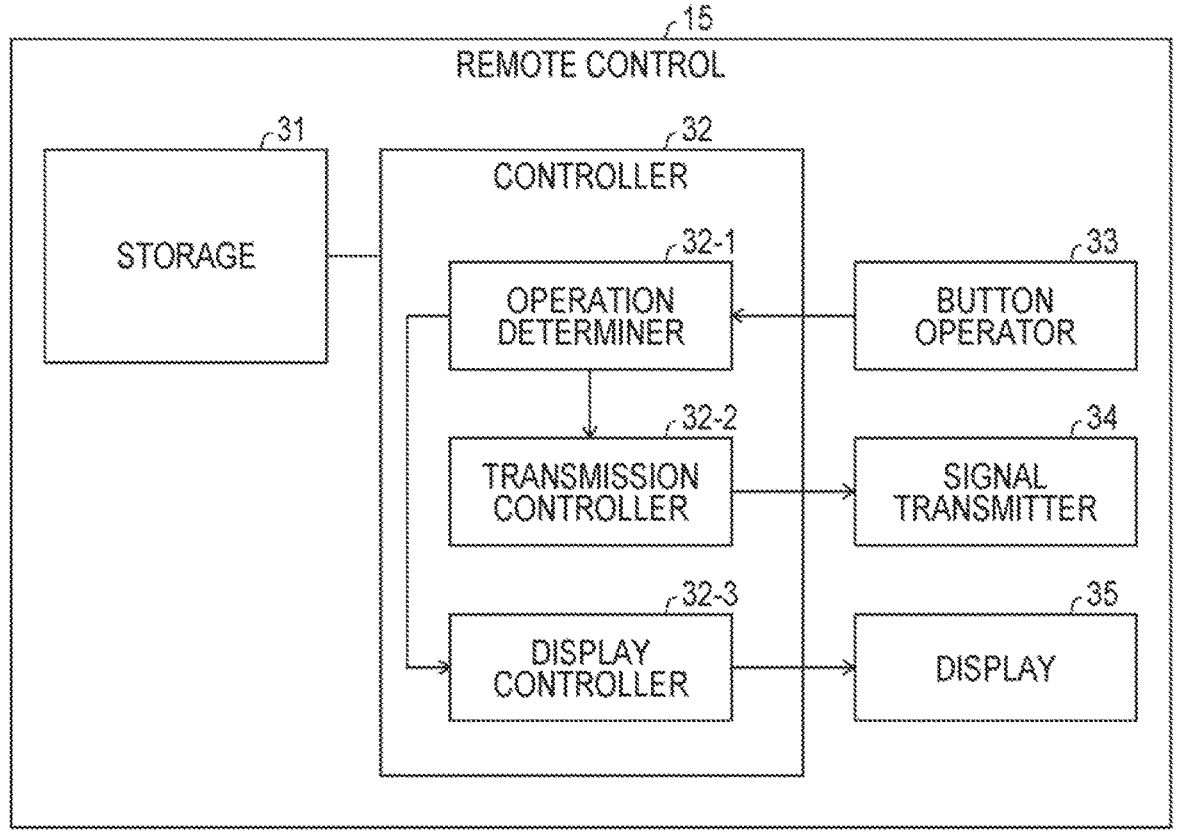
FIG. 3 is a block diagram showing a configuration of a remote control included in the remote control system.
Figure 6:
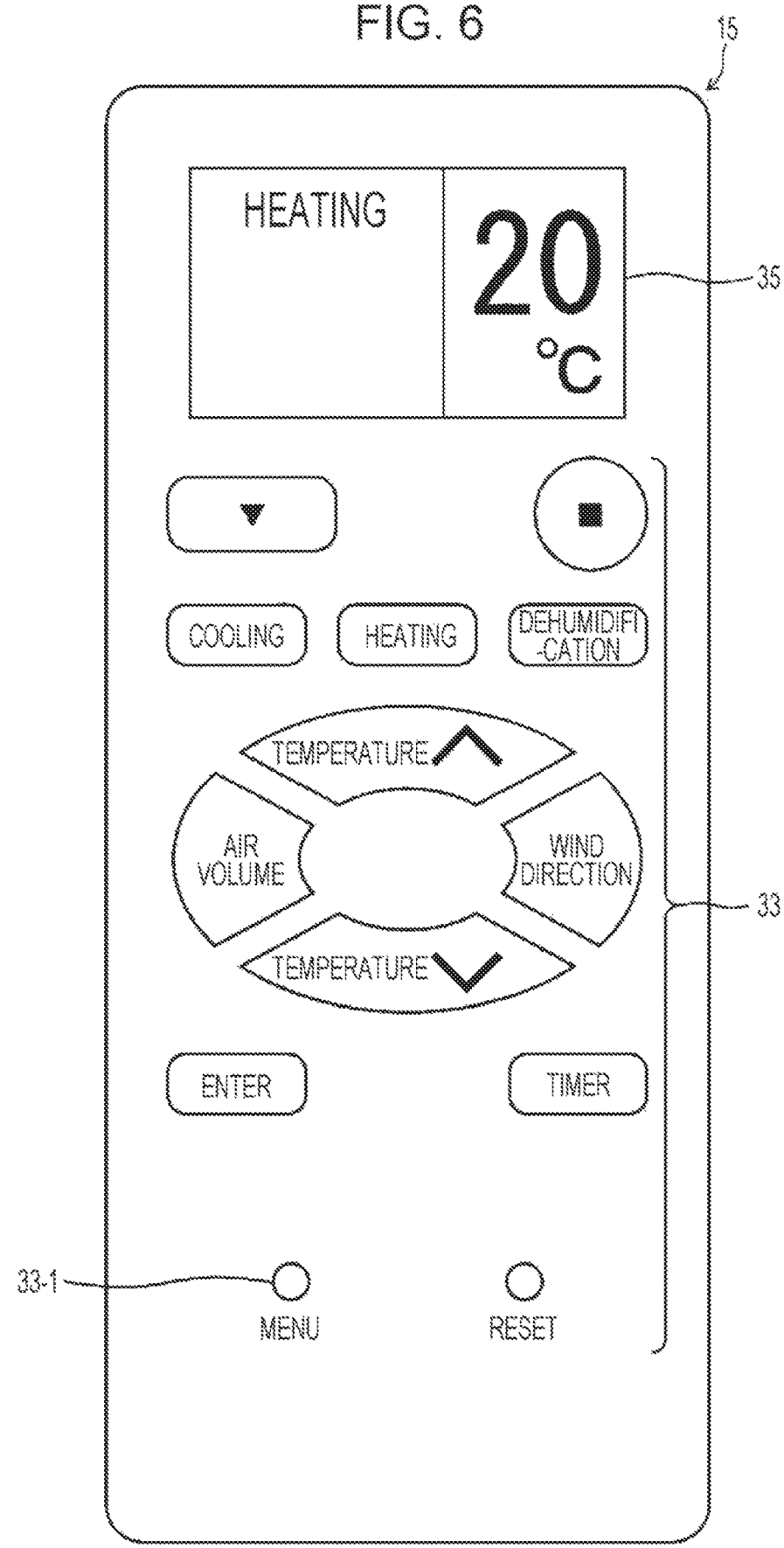
FIG. 6 is a front view showing an appearance of the air conditioner.

FIG. 3 is a block diagram showing a configuration of the main components of the remote control 15. FIG. 6 is a front view showing an appearance of the remote control 15. The remote control 15 may be an infrared remote control supplied with the air conditioner 12 or another remote control having an equivalent function.

As shown in FIG. 3, the remote control 15 includes a storage 31, a controller 32, a button operator 33, a signal transmitter 34, a display 35, and other components. The storage 31 has various types of information stored therein. The controller 32 includes an operation determiner 32-1, a transmission controller 32-2, and a display controller 32-3. The operation determiner 32-1 determines an operated button on the button operator 33 and a period of time for which it has been held down. The transmitter 32-2 controls the signal transmitter 34 on the basis of a determination made by the operation determiner 32-1. The display controller 32-3 controls the display 35. The display controller 22-3 is notified of the content of a determination by the operation determiner 32-1.

As shown in FIG. 6, the button operator 33 includes a variety of buttons for giving instructions to the air conditioner 12 to make it perform actions such as the turning on and turning off of the air conditioner 12, switching of operation modes, changing of preset temperatures, changing of air volumes, and changing of wind directions. The operation determiner 32-1 determines an operated button on the button operator 33 and a period of time for which it has been held down, and the transmission controller 32-2 controls the signal transmitter 34 to output a remote control signal corresponding to the operated button and the period of time for which it has been held down.

In addition to the action buttons every pressing of which effects a change in operating state of the air conditioner 12 such as the turning on and turning off of the air conditioner 12, switching of operation modes, changing of preset temperatures, changing of air volumes, and changing of wind directions, the button operator 33 also includes a function button whose pressing does not effect a change in operating state of the air conditioner 12. For example, the menu button 33-1 corresponds to the function button.

The menu button 33-1 is a button provided in the upper part of the button operator 33 for use in changing from displaying one image to displaying another on the display 35. A pressing of the menu button 33-1 is detected by the operation determiner 32-1, and the display controller 32-3, which controls the display 35, changes from displaying one image to displaying another on the display 35.

A pressing of the menu button 33-1 makes switching from a normal screen, such as that shown in FIG. 6, that displays the temperature and the operation mode to a setting screen for configuring the various settings. The setting screen includes a screen for giving an instruction to the air conditioner 12 to make it power on or off the first communicator 23, i.e. connect to or disconnect from the communication network 60. Selecting an item for example by moving a cursor on the various setting screens and then pressing an ENTER button makes it possible to give instructions to the air conditioner 12 about the contents of the settings configured on the setting screen.

In the remote control 15 of the present embodiment, the menu button 33-1 is used also as the pairing request instruction button for activating the first communicator 23 of the air conditioner 12 to start a pairing. Upon receiving a signal indicating that the menu button 33-1 has been held down (for three seconds or longer), the air conditioner 12 activates the first communicator 23 to start a pairing.

The remote control 15 accepts a pairing request operation for causing the air conditioner 12 to transmit pairing request data through the first communicator 23. Further, as will be mentioned later, the remote control 15 also accepts a disconnection operation for causing the air conditioner 12 to disconnect communication with the communicator network 60.

(Configuration of Mobile Terminal 14)

Figure 4:
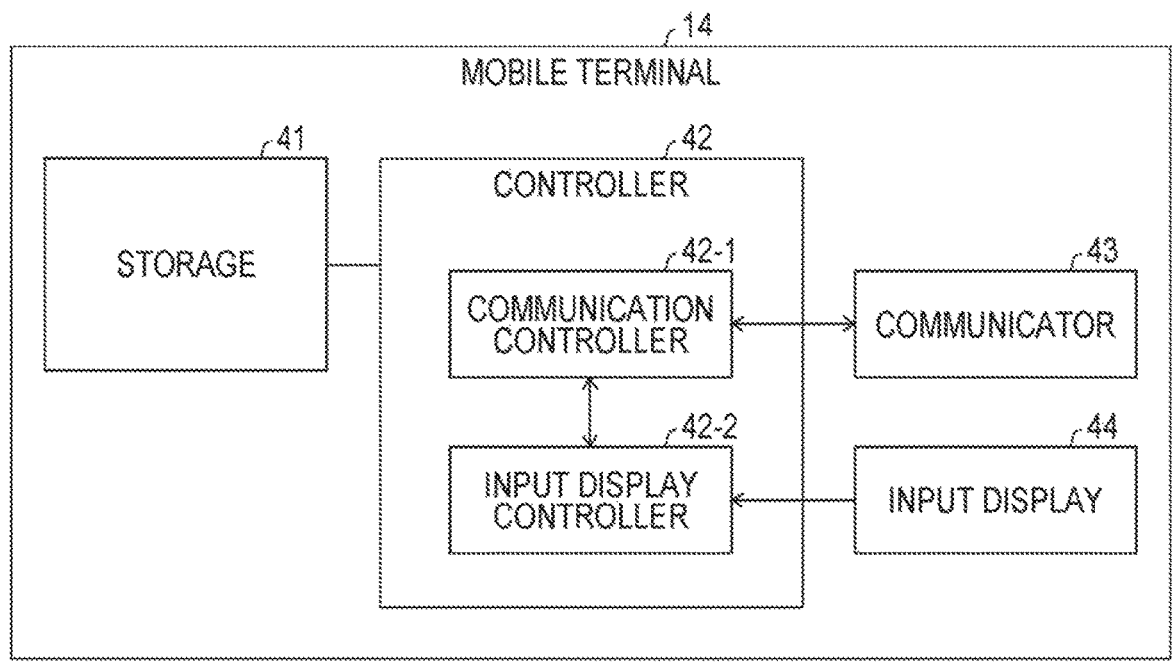
FIG. 4 is a block diagram showing a configuration of a mobile terminal included in the remote control system.

FIG. 4 is a block diagram showing a configuration of the main components of the mobile terminal 14. As shown in FIG. 4, the mobile terminal 14 includes a storage 41, a controller 42, a communicator 43, an input display 44, and other components. The storage 41 has various types of information stored therein. The storage 41 also has stored therein an application (hereinafter referred to as "app") that enables remote control by making a pairing of the air conditioner 12 and the mobile terminal 14 and a pairing of the air conditioner 12 and the server 11.

The communicator 43 connects the mobile terminal 14 to the communication network 60. The input display 44 is for example constituted by a liquid crystal panel including a touch panel and displays various types of information. The controller 42 includes a communication controller 42-1 and an input display controller 42-2. The communication controller 42-1 controls the communicator 43, and the input display controller 42-2 controls the input display 44.

A pairing of the air conditioner 12 and the wireless AP 13 and pairings of the air conditioner 12 with the server 11 and the mobile terminal 14 in the foregoing configuration are described. Pairings of the air conditioner 12 with the wireless AP 13, the server 11, and the mobile terminal 14 can also be made in a case where the air conditioner 12 is performing an air-conditioning operation. Since the function button on the remote control 15 serves as the pairing request instruction button, a pairing process can be performed even in a state where the air conditioner 12 is performing an air-conditioning operation.

(Pairing of Air Conditioner 12 and Wireless AP 13)

Figure 7:
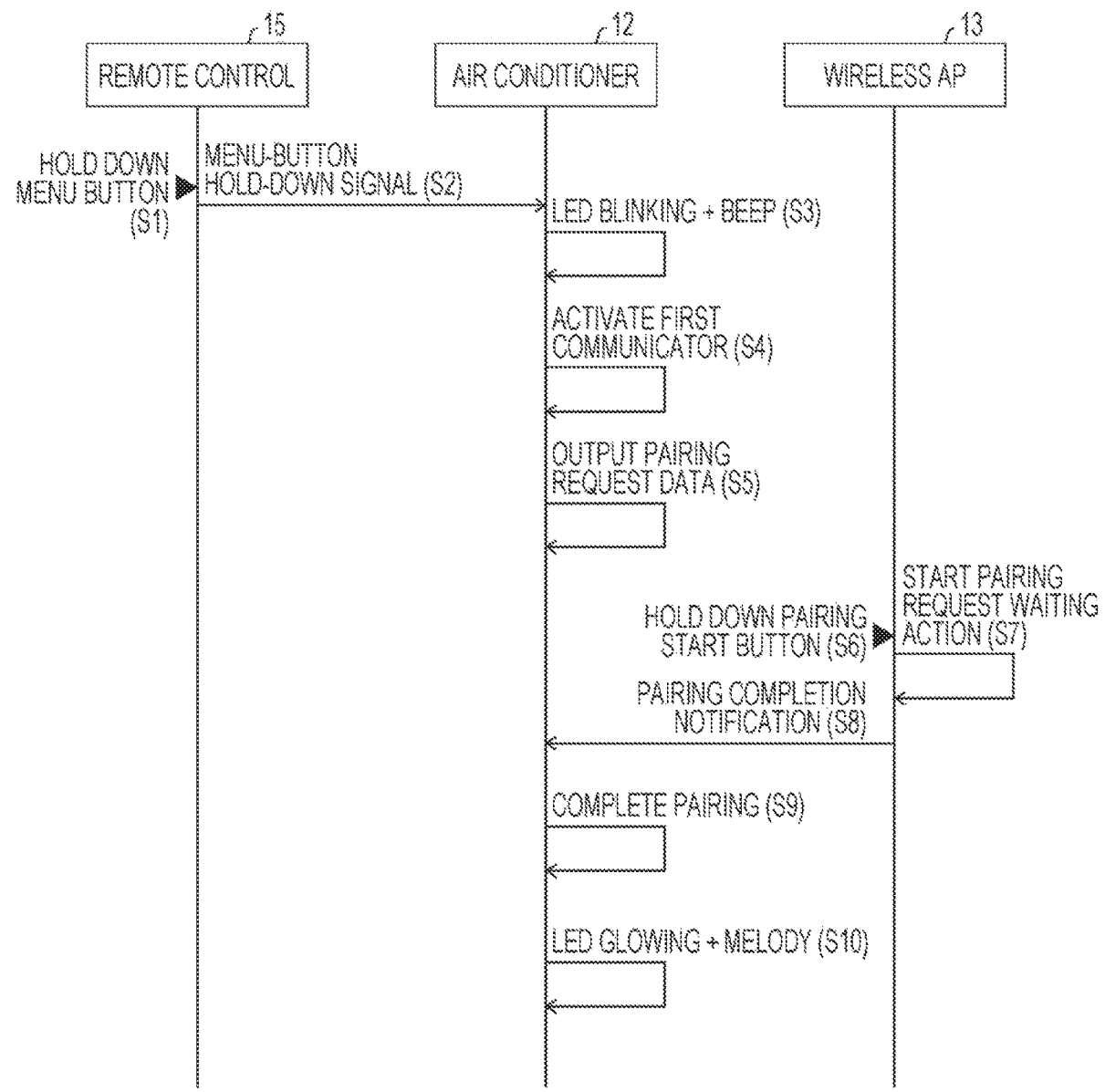
FIG. 7 is a chart showing the sending and receiving of instructions and replies among constituent elements during a pairing of the air conditioner and a wireless AP with use of the remote control.

FIG. 7 is a chart showing the sending and receiving of instructions and replies among constituent elements during a pairing of the air conditioner 12 and the wireless AP 13 with use of the remote control 15. FIG. 7 marks the user's actions with filled triangles. FIG. 7 refers to a case where an instruction to start a pairing is received in a state where the first communicator 23 is inactive, e.g. when the air conditioner 12 is installed, and the pairing has succeeded.

As shown in FIG. 7, when the user holds down the menu button 33-1, which corresponds to the pairing request instruction button, on the remote control 15 (S1), the remote control 15 transmits, to the air conditioner 12, a menu-button hold-down signal (remote control signal) indicating that the menu button 33-1 has been held down (S2).

By receiving the menu-button hold-down signal in a state where the first communicator 23 is powered off, the air conditioner 12 determines that it has received an instruction to start a pairing (pairing mode), and outputs a beep while causing the LED lamp 25-1 of the display 25 to blink (S3). Then, the air conditioner 12 activates the first communicator 23 (S4) and outputs pairing request data as a request for a pairing (S5). At this stage, the user can confirm through the blinking of the LED lamp 25-1 of the air conditioner 12 and the beep that the air conditioner 12 has started a pairing.

Next, the user holds down a pairing start button, such as the WPS (registered trademark) button of the wireless AP 13, for starting a pairing request waiting action (S6). With this, the wireless AP 13 starts a pairing request waiting action (S7) and, upon catching (receiving) the pairing request data being transmitted from the air conditioner 12, performs an authentication action for authenticating the air conditioner 12.

Upon completion of the authentication of the air conditioner 12, the wireless AP 13 sends a pairing completion notification to the air conditioner 12 to notify the air conditioner 12 of the completion of the pairing (S8). Upon receiving the pairing completion notification, the air conditioner 12 completes the pairing (S9) and then plays a melody while causing the LED lamp 25-1 to glow (S10). Through the change from blinking to glowing of the LED lamp 25-1 of the air conditioner 12 and the melody being played, the user confirms that the pairing has succeeded.

It should be noted that in a case where after having started a pairing request waiting action, the wireless AP 13 cannot catch the pairing request data being transmitted from the air conditioner 12, the wireless AP 13 cannot perform an authentication action for authenticating the air conditioner 12. When a predetermined period of time elapses without a shift to an authentication action, the wireless AP 13 ends the pairing request waiting action.

When a certain period of time elapses without the air conditioner 12 receiving a pairing completion notification, the air conditioner 12 determines that it has failed in the pairing and, in a case where there is a wireless AP to which it was connected before it had started the pairing, connects to the wireless AP. In a case where there is no wireless AP to which it was connected before it had started the pairing, the air conditioner 12 produces a beep, turns off the LED lamp 25-1, and powers off the first communicator 23. Through the change from blinking to extinction of the LED lamp 25-1 of the air conditioner 12 and the beep being produced, the user determines that the pairing has failed, and redoes the operation from S1.

(Pairings of Air Conditioner 12 with Mobile Terminal 14 and Server 11)

Figure 8:
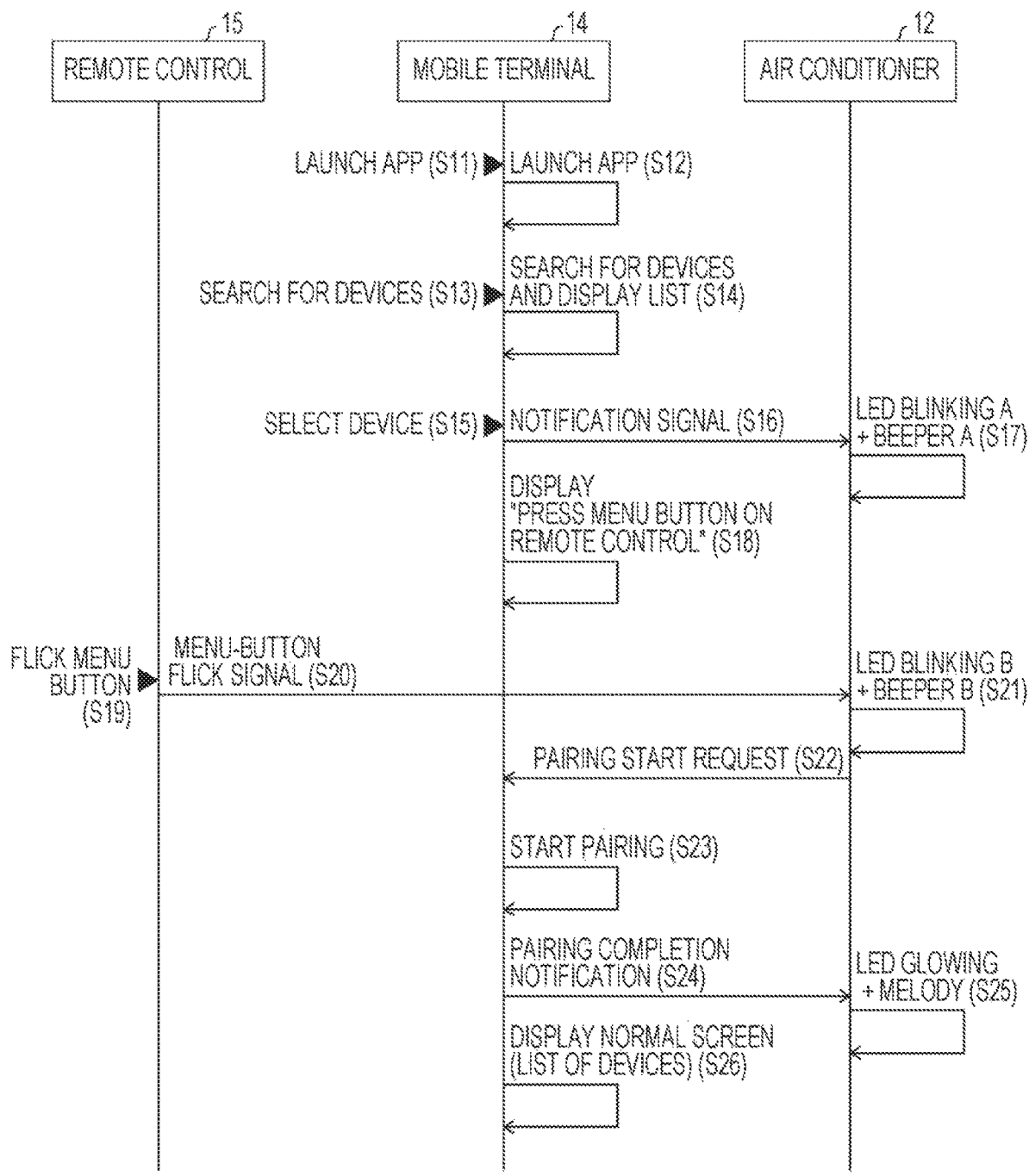
FIG. 8 is a chart showing the sending and receiving of instructions and replies among constituent elements during a pairing of the air conditioner and a mobile terminal.

FIG. 8 is a chart showing the sending and receiving of instructions and replies among constituent elements during a pairing of the air conditioner 12 and the mobile terminal 14. FIG. 8 marks the user's actions with filled triangles. FIG. 8 refers to a case where the pairing has succeeded.

As shown in FIG. 8, when the user gives an instruction through the mobile terminal 14 to launch an app for operating the air conditioner 12 (S11), the mobile terminal 14 launches the app (S12). It should be noted that the mobile terminal 14 and the wireless AP 13 are already paired with each other, and the air conditioner 12 and the mobile terminal 14 communicates with each other via the wireless AP 13.

When the user performs an operation on the app's screen to search for a device to be paired (S13), the mobile terminal 14 displays, on the app's screen, a list of wireless devices currently connected to the wireless AP 13 (S14). The user performs an operation on the app's screen to select the air conditioner 12, which is the device to be paired, from the list being displayed (S15). When the air conditioner 12, which is the device to be paired, has been selected, the mobile terminal 14 transmits, to the air conditioner 12, a notification signal indicating that the air conditioner 12 has been selected.

Upon receiving the notification signal from the mobile terminal 14, the air conditioner 12 causes the LED lamp 25-1 of the display 25 to blink in a pattern A and outputs a beep A or a voice (S17). Through the blinking A of the LED lamp 25-1 of the air conditioner 12 and the beep A, the user can confirm via the app that the air conditioner 12 is the target of pairing with the server 11 and the mobile terminal 14.

After the transmission of the notification signal, the app's screen of the mobile terminal 14 displays a message "FLICK MENU BUTTON ON REMOTE CONTROL" (S18).

When the user, looking at the display, flicks the menu button 33-1 on the remote control 15 (S19), the remote control 15 transmits, to the air conditioner 12, a menu-button flick signal (remote control signal) indicating that the menu button 33-1 has been flicked (S20).

Upon receiving the menu-button flick signal (remote control signal) from the remote control 15, the air conditioner 12 causes the LED lamp 25-1 of the display 25 to blink in a pattern B and outputs a beep B (S21). Then, the air conditioner 12 requests the mobile terminal 14 to start a pairing of the mobile terminal 14 and the server 11 via the app (S22). Causing the user to perform the operation of S19 to cause the air conditioner 12 to make a pairing start request makes it possible to inhibit a pairing from being made by a person who is in a place so distant from the air conditioner 12 that he/she cannot operate the air conditioner 12 with the remote control 15.

Upon receiving the pairing start request from the air conditioner 12, the mobile terminal 14 starts a pairing of the air conditioner 12 with the server 11 and the mobile terminal 14 via the app (S23). Upon completion of the pairing, the mobile terminal 14 transmits, to the air conditioner 12, a pairing completion notification indicating that the completion of the pairing of the air conditioner 12 with the server 11 and the mobile terminal 14 (S24). Upon receiving the pairing completion notification, the air conditioner 12 plays a melody or a voice while causing the LED lamp 25-1 to glow (S25). Through the change from blinking to glowing of the LED lamp 25-1 of the air conditioner 12 and the melody being played, the user confirms that the pairing of the air conditioner 12 with the server 11 and the mobile terminal 14 has succeeded. Upon completion of the pairing, the mobile terminal 14 displays a normal screen displaying a list of operable devices (S26).

In this way, the air conditioner 12 is paired with the server 11 and the mobile terminal 14.

(Operation for Disconnecting Air Conditioner 12 from Communication Network 60)

FIG. 9 is a chart showing the sending and receiving of instructions and replies among constituent elements after the holding down of the menu button 33-1 on the remote control 15 in a state where the air conditioner 12 is connected to the communication network 60. FIG. 9 marks the user's actions with filled triangles.

As shown in FIG. 9, when the user holds down the menu button 33-1 on the remote control 15 (S1), the remote control 15 transmits, to the air conditioner 12, a menu-button hold-down signal (remote control signal) indicating that the menu button 33-1 has been held down (S2).

Upon receiving the menu-button hold-down signal in a state where the first communicator 23 is powered on, the air conditioner 12 ends the driving of the first communicator 23 (S31). This causes the air conditioner 12 to be disconnected from the communication network 60.

The air conditioner 12 can also be disconnected from the communication network 60 by pressing the menu button 33-1 on the remote control 15 to display, on the display 35 of the remote control 15, a setting screen for giving an instruction to disconnect. However, in the case of a disconnection through the setting screen, a quick response is impossible, as it is necessary to perform an operation including several steps such as displaying the setting screen, selecting an item, and operating an ENTER button.

As compared with this, the configuration in which the menu button 33-1 on the remote control 15 is held down allows a quicker disconnection, as an instruction to disconnect can be given with just one push of the menu button 33-1. Although it is most desirable that the menu button 33-1 be configured to be provided on a surface of the remote control 15, the menu button 33-1 may be an openable remote control designed to be accessible by opening a cover.

It should be noted that in a case where the first communicator 23 has been powered off and disconnected from a communication line by holding down the menu button 33-1, the first communicator 23 is powered on and a pairing with the wireless AP 13 is started by holding down the menu button 33-1 again. This makes it possible to, as will be mentioned later, connect to the communication network 60 by connecting to the wireless AP 13 with which the previous pairing was made. Further, it is also possible to connect to the communication network 60 by powering on the first communicator 23 through a setting screen displayed on the display 35 of the remote control 15.

(Operation after Holding Down of Menu Button 33-1 at Time when First Communicator 23 is Powered Off with Pairing Finished)

FIG. 10 is a chart showing the sending and receiving of instructions and replies among constituent elements after the holding down of the menu button 33-1 at the time that the first communicator 23 is powered off with pairing finished. FIG. 10 marks the user's actions with filled triangles.

As shown in FIG. 10, when the user holds down the menu button 33-1 on the remote control 15 (S1), the remote control 15 transmits, to the air conditioner 12, a menu-button hold-down signal (remote control signal) indicating that the menu button 33-1 has been held down (S2).

By receiving the menu-button hold-down signal in a state where the first communicator 23 is powered off, the air conditioner 12 executes steps S3 to S5 as shown in the chart of FIG. 7, outputs a beep while causing the LED lamp 25-1 to blink, and activates the first communicator 23 to start a pairing.

However, since the user does not press the pairing start button of the wireless AP 13, the air conditioner 12 cannot receive a pairing completion notification. When a predetermined period of time (e.g. two minutes) elapses without the air conditioner 12 receiving a pairing completion notification, the air conditioner 12 connects to the wireless AP 13 with which it was previously paired (S41).

As noted above, the communication control system of the present embodiment makes it possible to make a pairing of a common push-button wireless AP 13 and the air conditioner 12 by holding down the menu button 33-1 on the remote control 15 of the air conditioner 12 once.

Such a pairing operation involving the use of the remote control 15 includes only operating the remote control 15 device at hand except for pressing the pairing start button for causing the wireless AP 13 to start a pairing request waiting action, thus eliminating the need to operate a button provided on the air conditioner 12. This makes it possible to connect the air conditioner 12 to the communication network 60 by easily pairing the air conditioner 12 and the wireless AP 13 with each other.

Further, upon receiving, from the remote control 15, a signal indicating that the menu button 33-1 has been held down in a state where the first communicator 23 is inactive, the controller 22 of the air conditioner 12 activates the first communicator 23 to make a pairing request.

The foregoing configuration does not even require a button operation for activating the first communicator 23 and makes it possible to, simply by holding down the menu button 33-1, activate the first communicator 23 to perform a pairing process.

Further, the menu button 33-1 on the remote control 15 also functions as a disconnection instruction button for giving an instruction to the air conditioner 12 to make it disconnect from the communication network 60. Upon receiving, from the remote control 15, a signal indicating that the menu button 33-1 has been held down in a state where the first communicator 23 is activated, the controller 22 of the air conditioner 12 disconnects the first communicator 23 from the wireless AP 13.

The foregoing configuration makes it possible to quickly disconnect the air conditioner 12 from the communication network 60 simply by operating the menu button 33-1. Moreover, a button for activating the first communicator 23 to start a pairing and a button for powering off the first communicator 23 to disconnect from the wireless AP 13 are achieved by performing the same operation (hold-down) on the same button. This makes it possible to reduce the number of buttons, and the single integrated button can be easy to remember and easy to use.

Furthermore, in the configuration, the menu button 33-1, which is a function button on the remote control 15 whose pressing does not effect a change in operating state of the air conditioner 12, is used as a message request instruction button and the disconnection instruction button, and the menu button 33-1 is held down.

This makes it possible to avoid an increase in the number of buttons on the remote control caused by providing less frequently used dedicated buttons such as the pairing request instruction button and the disconnection instruction button.

Moreover, the function button is configured to serve a dual purpose and be held down. This makes it possible to, even in a state where the air conditioner 12 is performing an air-conditioning operation, pair or disconnect the air conditioner 12 with or from the wireless AP 13 without posing a problem for the operation of the air conditioner 12.

Embodiment 2

Another embodiment of the present invention is described. For convenience of explanation, members having the same functions as those described in the embodiment described above are given the same signs and are not described below.

A communication control system of the present embodiment differs from the communication control system of Embodiment 1 in terms of an operation that is performed after the menu button 33-1 has been held down when the first communicator 23 is powered off with pairing finished. In other respects, the communication control system of the present embodiment is identical to the communication control system of Embodiment 1.

Figure 11:
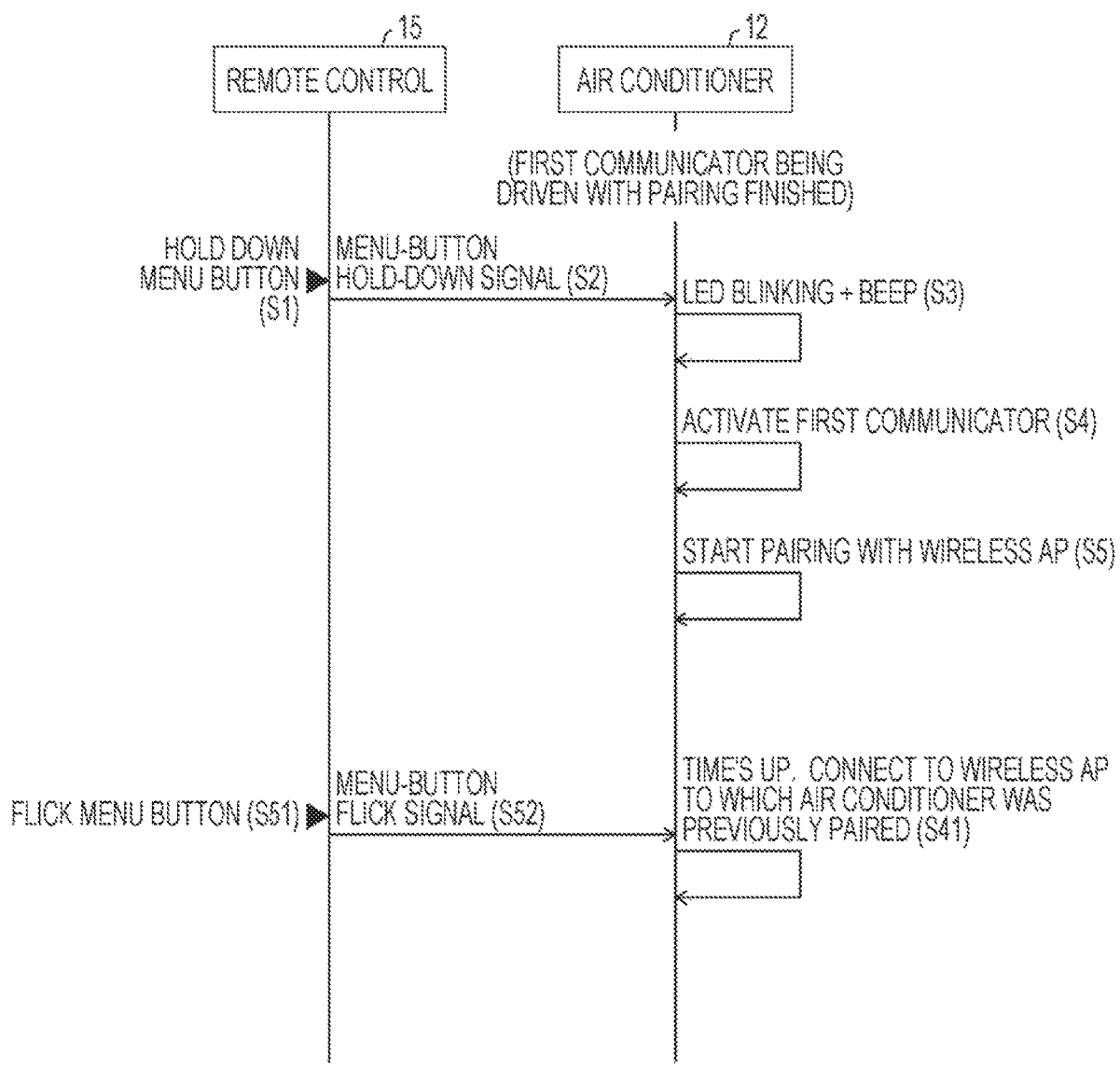
FIG. 11 is a chart showing the sending and receiving of instructions and replies among constituent elements after the holding down of the menu button at the time that the first communicator is powered off with pairing finished according to another embodiment of the present invention.

FIG. 11 is a chart showing the sending and receiving of instructions and replies among constituent elements after the holding down of the menu button 33-1 at the time that the first communicator is powered off with pairing finished. FIG. 11 marks the user's actions with filled triangles.

As shown in FIG. 11, when the user holds down the menu button 33-1 on the remote control 15 (S1), the remote control 15 transmits, to the air conditioner 12, a menu-button hold-down signal (remote control signal) indicating that the menu button 33-1 has been held down (S2).

By receiving the menu-button hold-down signal in a state where the first communicator 23 is powered off, the air conditioner 12 executes steps S3 to S5 as shown in the chart of FIG. 7, outputs a beep while causing the LED lamp 25-1 to blink, and activates the first communicator 23 to start a pairing. The above actions are the same as those shown in the chart of FIG. 10.

In the present embodiment, as shown in FIG. 11, when the user flicks the menu button 33-1 on the remote control 15 after the start of a pairing in S5 (S51), the remote control 15 transmits, to the air conditioner 12, a menu-button flick signal (remote control signal) indicating that the menu button 33-1 has been flicked (S52).

Upon receiving the menu-button flick signal (remote control signal) from the remote control 15 while transmitting pairing request data, the air conditioner 12 connects to the wireless AP 13 to which it was previously paired, without waiting for a predetermined period of time (e.g. two minutes) to elapse (S41). Although not described in FIG. 11, in the communication control system of the present embodiment, too, when a predetermined period of time elapses without the air conditioner 12 receiving a menu-button flick signal (remote control signal), the air conditioner 12 connects to the wireless AP 13 with which it was previously paired (S41).

Embodiment 3

Another embodiment of the present invention is described. For convenience of explanation, members having the same functions as those described in the embodiments described above are given the same signs and are not described below.

In each of the communication control systems of Embodiments 1 and 2, the remote control 15 is provided with a button for giving an instruction to the air conditioner 12 to make it transmit pairing request data in connecting the air conditioner 12 and the wireless AP 13 to each other. In the present embodiment, on the other hand, by launching an app, a display is performed on a mobile terminal 14 paired with the air conditioner 12. That is, a button for giving an instruction to the air conditioner 12 to make it transmit pairing request data is displayed on the app's screen. Further, the disconnection instruction button too is displayed on the app's screen by launching the app.

Figure 12:
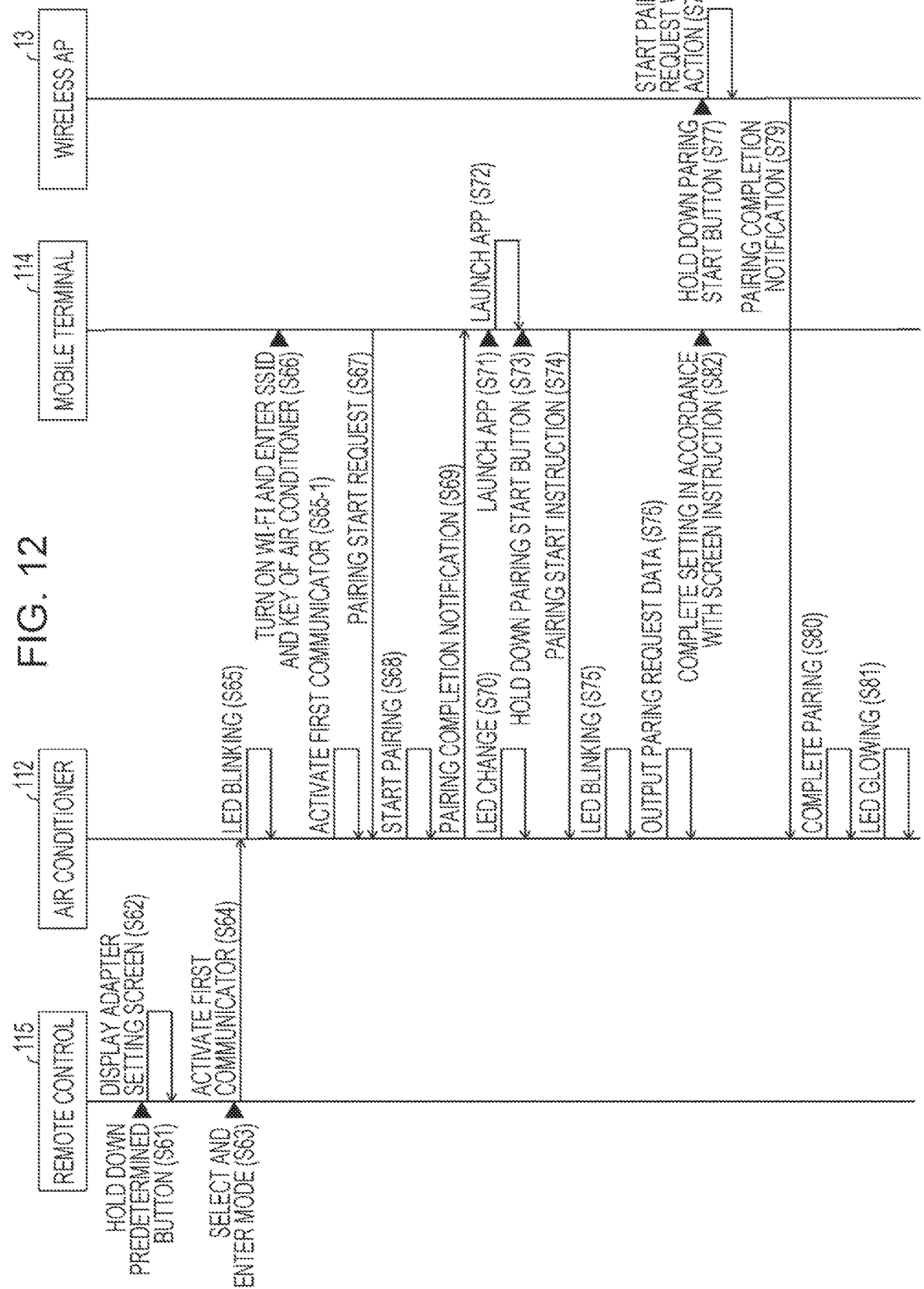
FIG. 12 is a chart showing the sending and receiving of instructions and replies among constituent elements during pairings of an air conditioner with a wireless AP, a server, and a mobile terminal according to another embodiment of the present invention.

FIG. 12 is a chart showing the sending and receiving of instructions and replies among constituent elements during pairings of an air conditioner 112 with the wireless AP 13, the server 11, and a mobile terminal 114. FIG. 12 marks the user's actions with filled triangles.

As shown in FIG. 12, when the user holds down a predetermined button on a remote control 115 (S61), a display of the remote control 115 displays a setting screen (adapter setting screen) of a first communicator 23 contained in the air conditioner 112 (S62).

When, on the setting screen, the user selects a predetermined mode and presses an ENTER button (S63), the remote control 115 sends, to the air conditioner 112, a signal for giving an instruction to activate the first communicator 23 (S64). This causes an LED of a display of the air conditioner 112 to start blinking (S65), and the first communicator 23 of the air conditioner 12 becomes activated (S65-1). It should be noted that a beep may be outputted in S65.

Next, the user turns on a Wi-Fi (registered trademark) of the mobile terminal 14 through the settings or the like of the mobile terminal 114 and enters an SSID and a KEY enclosed in an instruction manual or the like of the air conditioner 112 (S66), and the mobile terminal 114 requests the air conditioner 112 for a pairing (S67). The air conditioner 112 starts the pairing that in response to the pairing request from the mobile terminal 114 (S68), and upon completion of the pairing, the air conditioner 112 sends a pairing completion notification to the mobile terminal 114 to notify the mobile terminal 114 of the completion of the pairing (S69). With this, the air conditioner 112 changes the blinking pattern of the LED of the display (S70). The pairing of the air conditioner 112 and the mobile terminal 14 causes the air conditioner 112 to be also paired with the server 11.

Next, when the user gives an instruction through the mobile terminal 114 to launch an app for operating the air conditioner 12 (S71), the mobile terminal 114 launches the app (S72). The mobile terminal 114 displays a pairing start button for giving an instruction to the air conditioner 112 to make it transmit pairing request data.

When the user operates the app's screen and holds down a pairing request instruction button on the app's screen (S73), the mobile terminal 14 transmits, to the air conditioner 112, a signal indicating that the pairing request instruction button has been held down (S74).

Upon receiving the signal indicating that the pairing request instruction button has been held down, the air conditioner 112 causes the LED of the display of the air conditioner 112 to blink to indicate that a pairing is being made again (S75), and outputs pairing request data as a request for a pairing (S76). At this stage, the user can confirm through the blinking or the like of the LED of the air conditioner 112 in S75 that the air conditioner 112 and the wireless AP 13 has started a pairing.

Next, the user holds down a pairing start button, such as the WPS (registered trademark) button of the wireless AP 13, for starting a pairing request waiting action (S77). With this, the wireless AP 13 starts a pairing request waiting action (S78) and, upon catching the pairing request data being transmitted from the air conditioner 112, performs an authentication action for authenticating the air conditioner 112.

Upon completion of the authentication of the air conditioner 112, the wireless AP 13 sends a pairing completion notification to the air conditioner 112 to notify the air conditioner 112 of the completion of the pairing (S79). Upon receiving the pairing completion notification, the air conditioner 112 completes the pairing (S80) and then causes the LED lamp to glow (S81). In the meantime, the user configures the necessary settings for pairing the air conditioner 112 with the mobile terminal 114 and the server 11 via the app in accordance with the app's screen on the mobile terminal 114.

In this way, a mobile terminal 114 already paired with the air conditioner 112 may serve as a button that causes the first communicator 23 of the air conditioner 112 to transmit a pairing request instruction.

Then, in the configuration in which the app is used to use the mobile terminal 114 like the remote control 115 of the air conditioner 112, a disconnection instruction button too is displayed on the app's screen.

Embodiment 4

Another embodiment of the present invention is described. For convenience of explanation, members having the same functions as those described in the embodiments described above are given the same signs and are not described below.

Each of Embodiments 1 to 3 described above activates the first communicator 23 in S4 of FIGS. 7 and 11 and S65-1 of FIG. 12 and ends the driving of the first communicator 23 in S31 of FIG. 9 to disconnect the first communicator 23 from the wireless AP 13 (communication network 60). The present embodiment describes a specific technique for activating and disconnecting the first communicator 23.

Figure 13:
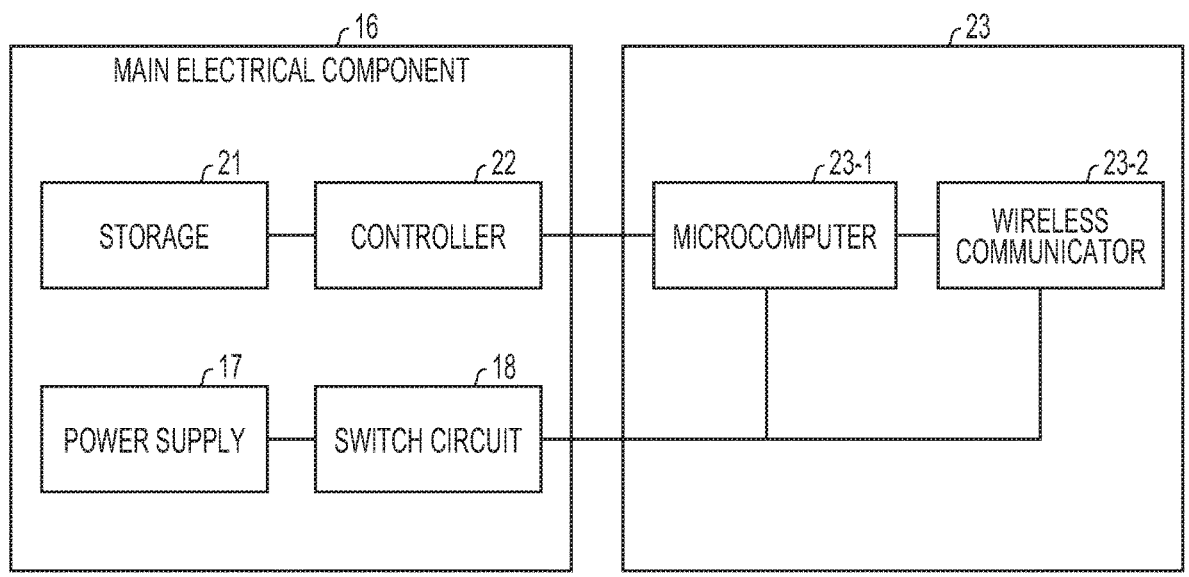
FIG. 13 is a block diagram showing a configuration of a first communicator and a main electrical component of an air conditioner according to another embodiment of the present invention.

FIG. 13 is a block diagram showing a configuration of the first communicator 23 and a main electrical component 16 of the air conditioner 12 according to the present embodiment. As shown in FIG. 13, the first communicator 23 includes a microcomputer (integrated circuit) 23-1 and a wireless communicator 23-2. The microcomputer 23-1 controls the first communicator 23. The main electrical component 16 of the air conditioner 12 includes a power supply 17 and a switch circuit 18 in addition to the controller 22 and the storage 21.

The microcomputer 23-1 of the first communicator 23 is connected to the controller 22 of the main electrical component 16. Further, the microcomputer 23-1 and the wireless communicator 23-2 are connected to the power supply 17 via the switch circuit 18, which is controlled by the controller 22. The microcomputer 23-1 and the wireless communicator 23-2 are supplied with a power supply voltage from the power supply 17 in a case where the switch circuit 18 is on.

In the present embodiment, the controller 22 activates the first communicator 23 by supplying a power supply voltage to the microcomputer 23-1 and the wireless communicator 23-2 by turning on the switch circuit 18. Further, the controller 22 disconnects the first communicator 23 from the wireless AP 13 by ending the driving of the first communicator 23 by stopping supplying the power supply voltage to the microcomputer 23-1 and the wireless communicator 23-2 by turning off the switch circuit 18.

As noted above, in the present embodiment, the air conditioner 12 activates the first communicator 23 into an on state by supplying a power supply voltage to the first communicator 23 and disconnects the first communicator 23 from the wireless AP 13 (communication network 60) by bringing the first communicator 23 into an off state by stopping supplying the power supply voltage to the first communicator 23.

Embodiment 5

Another embodiment of the present invention is described. For convenience of explanation, members having the same functions as those described in the embodiments described above are given the same signs and are not described below.

In each of the first to third embodiments described above, a state where the first communicator 23 is activated is expressed as "power-on state", and a state where the driving of the communicator 23 has been ended is expressed as "power-off state". However, a power-on state where the first communicator 23 is activated and a power-off state where the driving has been ended can also be achieved by a method other than the power supply voltage supply switching method described in the fourth embodiment. The present embodiment describes a technique for activating and disconnecting the first communicator 23 which is different from that described in Embodiment 4.

Figure 14:
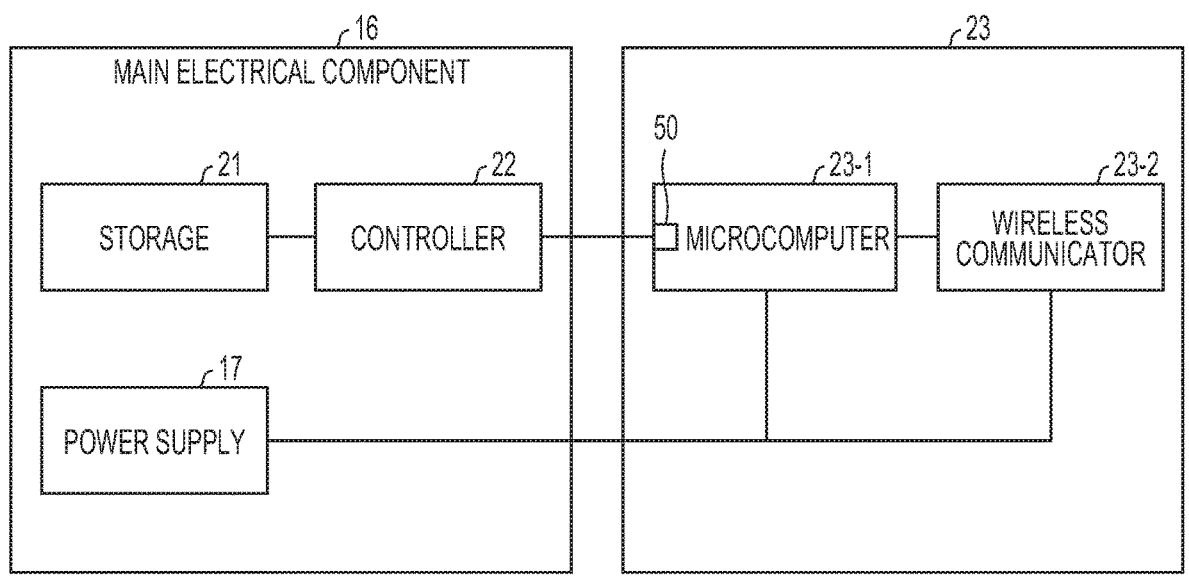
FIG. 14 is a block diagram showing a configuration of a first communicator and a main electrical component of an air conditioner according to another embodiment of the present invention.

FIG. 14 is a block diagram showing a configuration of the first communicator 23 and the main electrical component 16 of the air conditioner 12 according to the present embodiment. As shown in FIG. 14, the main electrical component 16 includes no switch circuit 18. Therefore, in the present embodiment, a power supply voltage is always supplied to the microcomputer 23-1 and the wireless communicator 23-2 in a case where a plug of the air conditioner 12 is inserted in an outlet (that is, the power supply 17 of the main electrical component 16 is ready to supply a power supply voltage).

In the present embodiment, with a power supply voltage always supplied, the controller 22 activates and stops the first communicator 23 by controlling a signal that is outputted to a reset port 50 of the microcomputer 23-1. The microcomputer 23-1 is designed to change between reset and reset cancel according to the level of a signal that enters the reset port 50.

Accordingly, during a period of stoppage of the first communicator 23, the controller 22 outputs, to the reset port 50, a signal having such a level as to reset the microcomputer 23-1. When, in a driven state (reset cancel state), the microcomputer 23-1 detects the inputting to the reset port 50 of a signal having such a level as to reset the microcomputer 23-1, the microcomputer 23-1 enters into a reset state and stops driving. This brings the first communicator 23 into a stopped state where the first communicator 23 is disconnected from the wireless AP 13 (communicator network 60).

Meanwhile, during a period of activation and driving of the first communicator 23, the controller 22 outputs, to the reset port 50, a signal having such a level as to reset-cancel the microcomputer 23-1. When, in a stopped state (reset state), the microcomputer 23-1 detects the inputting to the reset port 50 of a signal having such a level as to reset-cancel the microcomputer 23-1, the microcomputer 23-1 cancels the reset state and starts driving. This activates the first communicator 23 to start driving.

As noted above, in the present embodiment, by controlling a signal that is inputted to the reset port 50 of the microcomputer 23-1 of the first communicator 23, the air conditioner 12 activates the first communicator 23 into an on state and brings the first communicator 23 into an off state to disconnect the first communicator 23 from the wireless AP 13 (communication network 60).

Such a configuration makes it possible to control the activation and stoppage of the first communicator by means of software and eliminate the need for a circuit component, such as a switch circuit, for switching the supply of a power supply voltage.

Further, the level of a signal being outputted to the reset port 50 can be stored in the controller 22. Therefore, for example, even when the plug of the air conditioner 12 is pulled out from the outlet, the next insertion can bring the first communicator back into a driven state in which the first communicator was before the plug had been pulled out.

Embodiment 6

Another embodiment of the present invention is described. For convenience of explanation, members having the same functions as those described in the embodiments described above are given the same signs and are not described below.

Each of Embodiments 1 to 3 described above is configured such that in FIGS. 7, 9, 10, and 11, when the user holds down the menu button 33-1, which corresponds to the pairing request instruction button, on the remote control 15 (S1), the remote control 15 transmits, to the air conditioner 12, a menu-button hold-down signal (remote control signal) indicating that the menu button 33-1 has been held down (S2).

Note here, more specifically, that as shown in FIG. 15, S2-1 is executed between S1 and S2. FIG. 15 is a chart showing in detail signals that are sent from the remote control to the air conditioner after the menu button has been held down. That is, as shown in FIG. 15, when the user holds down the menu button 33-1, which corresponds to the pairing request instruction button, on the remote control 15 (S1), a menu-button flick signal indicating the menu button 33-1 has been flicked is transmitted first (S2-1). After that, when a predetermined period of time (e.g. three seconds) elapses, the remote control 15 transmits, to the air conditioner 12, a menu-button hold-down signal (remote control signal) indicating that the menu button 33-1 has been held down (S2).

The menu-button flick signal that is transmitted in S2-1 is a signal that is outputted since the menu button 33-1 is shared. For example, in a case where the air conditioner 12 and the remote control 15 are liked with each other, the air conditioner 12 permits the link upon receiving the menu-button flick signal. It should be noted that since the menu-button flick signal, which the air conditioner 12 receives first, is irrelevant to a pairing, the air conditioner 12 ignores this signal and waits to receive the menu-button hold-down signal.

Embodiment 7

The blocks of the respective controllers of the air conditioner 12 (112), the mobile terminal 14 (114), and the remote control 15 in the communication control system may be achieved by a logic circuit (hardware) formed on an integrated circuit (IC chip) or the like or may be achieved by software through the use of a CPU (central processing unit).

In the latter case, the air conditioner 12 (112), the mobile terminal 14 (114), and the remote control 15 each include a CPU that executes a command of an information processing program that is software by which each function is achieved, a ROM (read-only memory) or storage device (which is referred to as "recording medium") on which the program and various types of data are computer-readably (or CPU-readably) recorded, and a RAM (random-access memory) onto which the program is unwound. Moreover, the object of the present invention is attained by a computer (or a CPU) reading the program from the recording medium and executing the program. A usable example of the recording medium is a "non-transient tangible medium" such as a tape, a disk, a card, a semiconductor memory, or a programmable logic circuit. Further, the program may be supplied to the computer via a given transmission medium (such as a communication network or a broadcast wave) via which the program can be transmitted. It should be noted that an aspect of the present invention may be achieved in the form of a data signal, embedded in carrier waves, by which the program is embodied by electric transmission.

CONCLUSION

According to Aspect 1 of the present invention, there is provided a communication control system including: an air-conditioning apparatus (air conditioner 12, 112) having a wireless device (first communicator 23); and an operating device (remote control 15, mobile terminal 114) that is capable of wirelessly operating the air-conditioning apparatus, wherein the communication control system controls a connection between the air-conditioning apparatus and a communication network, the operating device is capable of accepting a pairing request operation that causes the wireless device to transmit pairing request data, and upon receiving a signal indicating that the operating device has accepted the pairing request operation, the air-conditioning apparatus causes the wireless device to transmit the pairing request data, completes a pairing upon receiving, from a wireless access point, authentication data corresponding to the pairing request data thus transmitted, and connects the wireless device to the wireless access point.

The foregoing configuration makes it possible to make a pairing of a common push-button wireless AP 13 and the air-conditioning apparatus by operating the pairing request operation through the operating device.

Such a pairing operation involving the use of the operating device includes only operating the operating device at hand except for pressing a pairing start button of the wireless AP 13, thus eliminating the need to operate a button or the like provided on the air-conditioning apparatus. This makes it possible to connect the air-conditioning apparatus to the communication network 60 by easily pairing the air-conditioning apparatus and the wireless AP 13 with each other.

Furthermore, according to Aspect 2 of the present invention, there may be provided the communication control system, wherein upon receiving, from the operating device, a signal indicating that the operating device has accepted the pairing request operation in a state where the wireless device is inactive, the air-conditioning apparatus activates the wireless device and then causes the wireless device to transmit the pairing request data.

The foregoing configuration does not even require an operation for activating the wireless device and makes it possible to, simply by performing the pairing request operation, perform a pairing process.

Furthermore, according to Aspect 3 of the present invention, there may be provided the communication control system, wherein the operating device is capable of accepting a disconnection operation for instructing the air-conditioning apparatus to disconnect from the communication network 60, and upon receiving a signal indicating that the operating device has accepted the disconnection operation, the air-conditioning apparatus disconnects the wireless device from the wireless access point.

The foregoing configuration makes it possible to quickly disconnect the air-conditioning apparatus from the communication network 60 simply by performing the disconnection operation through the operating device.

Furthermore, according to Aspect 4 of the present invention, there may be provided the communication control system, wherein the operating device is a remote control device (remote control 15) of the air-conditioning apparatus, the remote control device has a predetermined function button, used also as a pairing request instruction button for accepting a pairing request operation, whose pressing does not effect a change in operating state of the air-conditioning apparatus, and the air-conditioning apparatus receives a signal indicating that the predetermined function button has been held down from the operating device as a signal indicating that the pairing request instruction button has been operated.

According to the foregoing configuration, the predetermined function button, provided on the remote control device, whose pressing does not effect a change in operating state of the air-conditioning apparatus is used also as the pairing request instruction button for accepting a pairing request operation. Since the pairing request instruction button is not used as frequently as an action button, providing the pairing request instruction button for sole use leads to an increase in the number of buttons on the remote control device. By thus using an existing button also as the pairing request instruction button, an increase in the number of buttons can be avoided.

Moreover, causing the function button to serve a dual purpose and be held down makes it possible to, even in a state where the air-conditioning apparatus is performing an air-conditioning operation, perform a process of pairing of the air-conditioning apparatus with the wireless access point without posing a problem for the operation of the air-conditioning apparatus.

Furthermore, according to Aspect 5 of the present invention, there may be provided the communication control system, wherein the operating device (remote control 15) is a remote control device of the air-conditioning apparatus, the remote control device has a predetermined function button, used also as a disconnection instruction button for accepting a disconnection instruction operation, whose pressing does not effect a change in operating state of the air-conditioning apparatus, and the air-conditioning apparatus receives a signal indicating that the predetermined function button has been held down from the operating device as a signal indicating that the disconnection instruction button has been operated.

According to the foregoing configuration, the predetermined function button, provided on the remote control device, whose pressing does not effect a change in operating state of the air-conditioning apparatus is used also as the disconnection instruction button for accepting a disconnection operation. Since the disconnection instruction button is not used as frequently as an action button, providing the disconnection instruction button for sole use leads to an increase in the number of buttons on the remote control device. By thus using an existing button also as the disconnection instruction button, an increase in the number of buttons can be avoided.

Moreover, causing the function button to serve a dual purpose and be held down makes it possible to, even in a state where the air-conditioning apparatus is performing an air-conditioning operation, disconnect the air-conditioning apparatus from the communication network 60 without posing a problem for the operation of the air-conditioning apparatus.

Furthermore, according to Aspect 6 of the present invention, there may be provided the communication control system, wherein the air-conditioning apparatus includes an annunciator (display 25, sound outputter 26) that informs a user of a change in state of communication with the wireless access point during a pairing.

The foregoing configuration allows the user to confirm a state of communication with the wireless access point during a pairing on the basis of information given from the annunciator.

Furthermore, according to Aspect 7 of the present invention, there may be provided the communication control system, wherein the annunciator is a single LED lamp installed in the air-conditioning apparatus, and the user is informed of a change in state of communication by changing a state of lighting of the LED lamp.

The foregoing configuration makes it possible to inform the user of a state of communication with the wireless access point during a pairing with a simple component such as a single LED lamp installed in the air-conditioning apparatus.

Furthermore, according to Aspect 8 of the present invention, there may be provided the communication control system, wherein the air-conditioning apparatus activates the wireless device into an on state by supplying a power supply voltage to the wireless device and disconnects the wireless device from the wireless access point by bringing the wireless device into an off state by stopping supplying the power supply voltage to the wireless device.

The foregoing configuration makes it possible to easily achieve a configuration in to activate the wireless device and disconnect the wireless device from the wireless access point.

Furthermore, according to Aspect 9 of the present invention, there may be provided the communication control system, wherein the wireless device includes an integrated circuit, and the air-conditioning apparatus activates the wireless device into an on state by controlling a signal that is inputted to a reset port of the integrated circuit and disconnects the wireless device from the wireless access point by bringing the wireless device into an off state by controlling the signal that is inputted to the reset port 50 of the integrated circuit.

The foregoing configuration makes it possible to control the activation and stoppage of the wireless device by means of software and eliminate the need for a circuit needed in a configuration in which to switch the supply of a power supply voltage.

Furthermore, according to Aspect 10 of the present invention, there is provided a remote control device (remote control 15) that is capable of wireless operating an air-conditioning apparatus (air conditioner 12) having a wireless device (first communicator 23), the remote control device including a pairing request instruction button for instructing the air-conditioning apparatus to transmit pairing request data through the wireless device.

Furthermore, according to Aspect 11 of the present invention, there may be provided the remote control device (remote control 15), further including a disconnection instruction button for giving an instruction to disconnect the wireless device from a wireless access point.

According to Aspect 12 of the present invention, there is provided an air-conditioning apparatus (air conditioner 12) including a wireless device (first communicator 23), wherein upon receiving, from an operating device that is capable of wirelessly operating the air-conditioning apparatus, a signal indicating that the operating device has accepted a pairing request operation, the air-conditioning apparatus causes the wireless device to transmit pairing request data, completes a pairing upon receiving, from a wireless access point, authentication data corresponding to the pairing request data thus transmitted, and connects the wireless device to the wireless access point.

Furthermore, according to Aspect 13 of the present invention, there may be provided the air-conditioning apparatus (air conditioner 12), wherein upon receiving, from the operating device, a signal indicating that the operating device has accepted a disconnection operation for disconnecting the air-conditioning apparatus from a communication network, the air-conditioning apparatus disconnects the wireless device from the wireless access point.

According to the foregoing configuration, a combination of Aspects 10 and 12 described above brings about working effects which are similar to those brought about by Aspect 1.

Further, according to the foregoing configuration, a combination of Aspects 11 and 13 described above brings about working effects which are similar to those brought about by Aspect 3.

The present invention is not limited to any of the embodiments described above but may be altered in various ways within the scope of the claims, and an embodiment based on a proper combination of technical means disclosed in different embodiments is encompassed in the technical scope of the present invention. Furthermore, a new technical feature can be formed by a combination of technical means respectively disclosed in embodiments.

REFERENCE SIGNS LIST

1 Remote control system
11 Server
12, 112 Air conditioner (air-conditioning apparatus)
14, 114 Mobile terminal
13 Wireless access point
15, 115 Remote control (operating device)
16 Main electrical component
17 Power supply
18 Switch circuit
21, 31, 41 Storage
22, 32, 42 Controller
22-1, 42-1 Communication controller
22-2 Remote control signal determiner
22-3, 32-3 Display controller
22-4 Sound controller
23 First communicator (wireless device)
23-1 Microcomputer (integrated circuit)
23-2 Wireless communicator
24 Second communicator
25 Display (annunciator)
25-1 LED lamp
26 Sound outputter (annunciator)
32-1 Operation determiner
32-2 Transmission controller
33 Button operator
33-1 Menu button
34 Signal transmitter
42-2 Input display controller
43 Communicator
44 Input display
50 Reset port
60 Communication network

The invention claimed is:

1. A communication control system comprising:
an air-conditioning apparatus having a wireless device; and
a remote control device that is capable of operating the air-conditioning apparatus,
wherein the communication control system controls a connection between the air-conditioning apparatus and a communication network,
the remote control device is capable of accepting a first pairing request operation that causes the wireless device to transmit pairing request data and a second pairing request operation that causes the air-conditioning apparatus to request a start of a pairing of the air-conditioning apparatus and a terminal device,
upon receiving, from the remote control device, a signal indicating that the remote control device has accepted the first pairing request operation, the air-conditioning apparatus causes the wireless device to transmit the pairing request data, completes the pairing upon receiving, from a wireless access point, authentication data corresponding to the pairing request data thus transmitted, and connects the wireless device to the wireless access point, and
upon receiving, from the remote control device without via a communication network, a signal indicating that the remote control device has accepted the second pairing request operation in a state where the wireless device is connected to the wireless access point, the air-conditioning apparatus is paired with a terminal device that is capable of operating the air-conditioning apparatus via a communication network.

2. The communication control system according to claim 1, wherein upon receiving, from the remote control device, a signal indicating that the remote control device has accepted the first pairing request operation in a state where the wireless device is inactive, the air-conditioning apparatus activates the wireless device and then causes the wireless device to transmit the pairing request data.

3. The communication control system according to claim 1, wherein the remote control device is capable of accepting a disconnection operation for instructing the air-conditioning apparatus to disconnect from the communication network, and
upon receiving a signal indicating that the remote control device has accepted the disconnection operation, the air-conditioning apparatus disconnects the wireless device from the wireless access point.

4. The communication control system according to claim 3, wherein
the remote control device has a predetermined function button, used also as an instruction button for accepting the first pairing request operation or the disconnection operation, which in case of pressing does not effect a change in operating state of the air-conditioning apparatus, and
the air-conditioning apparatus receives a signal indicating that the predetermined function button has been held down from the remote control device as a signal indicating that the instruction button has been operated.

5. The communication control system according to claim 1, wherein
the remote control device has a predetermined function button, used also as an instruction button for accepting the first pairing request operation, which in case of pressing does not effect a change in operating state of the air-conditioning apparatus, and the air-conditioning apparatus receives a signal indicating that the predetermined function button has been held down from the remote control device as a signal indicating that the pairing request instruction button has been operated.

6. The communication control system according to claim 1, wherein the air-conditioning apparatus includes an annunciator that informs a user of a change in state of communication with the wireless access point during a pairing.

7. The communication control system according to claim 1, wherein the air-conditioning apparatus activates the wireless device into an on state by supplying a power supply voltage to the wireless device and disconnects the wireless device from the wireless access point by bringing the wireless device into an off state by stopping supplying the power supply voltage to the wireless device.

8. The communication control system according to claim 1, wherein the wireless device includes an integrated circuit, and the air-conditioning apparatus activates the wireless device into an on state by controlling a signal that is inputted to a reset port of the integrated circuit and disconnects the wireless device from the wireless access point by bringing the wireless device into an off state by controlling the signal that is inputted to the reset port of the integrated circuit.

\* \* \* \* \*